United States Patent
Ishida et al.

(10) Patent No.: US 7,502,387 B2
(45) Date of Patent: Mar. 10, 2009

(54) COMMUNICATION TERMINAL, MESSAGE CENTER, TIME CONTROL PROGRAM STORAGE MEDIUM, AND REMOTE TIME SETTING PROGRAM STORAGE MEDIUM

(75) Inventors: Masaya Ishida, Sapporo (JP); Toshifumi Aso, Sapporo (JP); Shinya Kimura, Sapporo (JP); Masahiko Fuse, Sapporo (JP); Kazutaka Satoh, Sapporo (JP); Makoto Shinohara, Sapporo (JP); Makoto Funaoka, Sapporo (JP); Eiji Ishioka, Sapporo (JP); Masayuki Kurisu, Sapporo (JP)

(73) Assignee: Fujitsu Limited, Nakahara-Ku, Kawasaki-Shi Kanagawa (JP)

( * ) Notice: Subject to any disclaimer, the term of this patent is extended or adjusted under 35 U.S.C. 154(b) by 495 days.

(21) Appl. No.: 11/175,226

(22) Filed: Jul. 7, 2005

(65) Prior Publication Data
US 2006/0251127 A1 Nov. 9, 2006

(30) Foreign Application Priority Data
Mar. 25, 2005 (JP) ............................. 2005-089231

(51) Int. Cl.
*H04J 3/06* (2006.01)
(52) U.S. Cl. ..................................... 370/503
(58) Field of Classification Search .................. 370/503
See application file for complete search history.

(56) References Cited

U.S. PATENT DOCUMENTS

| 6,765,931 | B1* | 7/2004 | Rabenko et al. .............. 370/493 |
|---|---|---|---|
| 2002/0058518 | A1 | 5/2002 | Mitsugi |
| 2004/0090994 | A1* | 5/2004 | Lockridge et al. ............ 370/509 |
| 2004/0203620 | A1* | 10/2004 | Thome et al. ............. 455/412.1 |
| 2005/0090272 | A1* | 4/2005 | Anson et al. ................. 455/466 |
| 2005/0124390 | A1* | 6/2005 | Hansson et al. ........... 455/575.1 |

FOREIGN PATENT DOCUMENTS

| JP | 2000-206276 | 7/2000 |
|---|---|---|
| JP | 2000-287273 | 10/2000 |
| JP | 2002-156477 | 5/2002 |

\* cited by examiner

*Primary Examiner*—Rafael Pérez-Gutiérrez
*Assistant Examiner*—Yungsang Lau
(74) *Attorney, Agent, or Firm*—Fujitsu Patent Center

(57) ABSTRACT

A communication terminal having a wireless communication facility including sending and receiving a message which is sent to a receiving terminal without a send request from a receiving terminal through a message center, including: a message sending/receiving unit sending and receiving the message; a time control unit controlling current time; a message analysis unit analyzing a message which is sent by a message center, received by the message sending/receiving unit, and includes time information assigned by a message center, and retrieving the time information; and a time setting unit setting in the time control unit a time indicated by the time information retrieved by the message analysis unit as a current time.

4 Claims, 13 Drawing Sheets

COMMUNICATION TERMINAL, MESSAGE CENTER, TIME CONTROL PROGRAM STORAGE MEDIUM, AND REMOTE TIME SETTING PROGRAM STORAGE MEDIUM

BACKGROUND OF THE INVENTION

1. Field of the Invention

The present invention relates to a communication terminal having a wireless communication facility including transmission and reception of a message, a time control program storage medium storing a time control program which is executed in the communication terminal and controls the time of the communication terminal, a message center for intermediating for a message sent from a sending terminal and sending it to a receiving terminal, and a remote time setting program storage medium storing a remote time setting program which is executed in the message center and remotely sets the time of the communication terminal.

2. Description of the Related Art

Recently, a communication terminal of a mobile telephone, etc. has become widespread, and is loaded with not only a simple telephone facility, but also various facilities such as an electronic mail facility, a camera facility, an electronic money facility, thus presenting an aspect of total information processing equipment for personal use. Most of the communication terminals having various facilities are provided with a time display facility, and using the facility an increasing number of users use the communication terminal for a watch.

The above-mentioned communication terminal has a time correction facility, and when the time is not correctly set, it can be correctly set using the communication terminal. However, the time setting operation is unexpectedly troublesome, and a number of users hesitate to correctly set the time.

Under such circumstances, the technology of automatically setting the time of a communication terminal by wireless has been suggested.

For example, Patent Document 1 (Japanese Patent Laid-Open No. 2000-206276) proposes a communication terminal capable of automatically setting the time by loading the function of a radio clock in a communication terminal.

Patent Document 2 (Japanese Patent Laid-Open No. 2002-156477) proposes the technology of setting the time of the communication terminal by preparing, for example, a car navigation device loaded with a GPS (global positioning system) for a communication terminal, extracting time data from the GPS data after receiving the GPS data using the device, and sending the time data to the communication terminal over a network. The document also describes setting the time for a communication terminal by taking the delay time in communications through the network into account.

Patent Document 3 (Japanese Patent Laid-Open No. 2000-287273) discloses the technology of setting the time of a PHS (personal handyphone system) having a clock facility by setting time data in a message to be sent from a base station to the PHS.

In the technology of loading a radio clock for a communication terminal disclosed by the above-mentioned patent document 1, although the time of the communication terminal is correctly set, it is necessary to implement new hardware of a radio clock in the communication terminal, whereby producing a costly system.

Furthermore, the technology of intermediating with a car navigation device, etc. disclosed by the above-mentioned patent document 2 requires such a new intermediate device, thereby producing an entirely expensive system, and producing a personal clock correction system of, for example, being used only as a communication terminal of the same user as the device, etc. and is not used for the entire subscriber terminals.

Additionally, the technology described by the patent document 3 of sending a message including time data set from the base station to the PHS terminal requires no additional hardware, but it is necessary to add or amend software of the PHS terminal and the base station. However, although the software of both a PHS terminal and a base station is changed, the time delay of a message sent through a communication path is not considered. Therefore, the problem of the cost required for adding or improving the software occurs, and the high precision time correction facility corresponding to the cost cannot be realized, thereby incurring unbalanced cost and facility.

SUMMARY OF THE INVENTION

The present invention has been developed to solve the above-mentioned problems, and aims at providing a communication terminal, a message center, a time control program storage medium, and a remote time setting program storage medium preferably applied to the structure of a system for remotely setting the time of a communication terminal with a required cost well balanced with a realized time correction facility.

The communication terminal for attaining the advantage according to the present invention has a wireless communication facility including sending and receiving a message which is received from a transmitting terminal and sent to a receiving terminal without a send request from a receiving terminal through a message center includes: a message sending/receiving unit for sending and receiving the above-mentioned message; a time control unit for controlling the current time; a message analysis unit for analyzing a message which is sent by a message center, received by the message sending/receiving unit, and includes time information assigned by a message center, and retrieving the time information; and a time setting unit for setting in the time control unit a time indicated by the time information retrieved by the message analysis unit as a current time.

A number of recent communication terminals have a message sending/receiving facility called an SMS (short message service) which becomes rapidly widespread.

The standard of the SMS more or less depends on the carrier, but the facility is a kind of electronic mail facility of sending a short message formed of normally several characters from a message center to a receiving terminal using the telephone number of a correspondent as an address through the message center without waiting a send request from the receiving terminal. In the normal electronic mail, when electronic mail is sent from a sending terminal, the electronic mail is temporarily stored in a device called a mail server, and is sent to a receiving terminal at a send request from the receiving terminal. However, in the SMS, a message is sent to a receiving terminal without waiting for a request from the receiving terminal. The SMS message contains sending time information when the message is sent from a message center to a receiving terminal, and when a message once is not successfully sent and to be sent again, for example, in a case where the receiving terminal is located outside the communication range, the message to be sent again contains the sending time information about the re-sending time.

The present invention concentrates attention on this point. For example, a message, for example, an SMS message, etc. sent from a sending terminal is set by retrieving time information from a message sent to a receiving terminal without a send request from the receiving terminal through a message center. In this case, a very small improvement in software only on the communication terminal side is required, thereby realizing time correction facility with a cost successfully reduced.

However, there remains an error as a time delay in sending and receiving a message, and the problem can be solved as follows.

That is, it is preferable that the above-mentioned communication terminal according to the present invention further includes; a sequence control unit for performing a time setting sequence by monitoring the time setting sequence including two times of receiving a message to identify whether the message is the first message or the second message; and a message generation unit for receiving the first message for setting a time, generating a reply message informing the reception of the first message and including time information indicating the sending time of the reply message and making the message sending/receiving unit send the reply message to a message center.

Furthermore, the message center according to the present invention intermediates with a message sent from a sending terminal, sends the message to a receiving terminal without waiting for a send request from the receiving terminal, and includes: a message sending/receiving unit for sending and receiving a message; a time control unit for controlling the current time; a message generation unit for generating a first message including time information indicating a sending time, and making the message sending/receiving unit send the first message to a communication terminal for which a time is to be set; a message analysis unit for retrieving time information from a reply message which is sent from a communication terminal receiving the first message, received by the message sending/receiving unit, informs of reception of the first message, and includes time information indicating a sending time of the reply message from the communication terminal; and a time error calculation unit for calculating a time error between a message sending time in the message center and a time setting time by the communication terminal for which a time is to be set according to time information contained in the first message generated by the message generation unit, and time information retrieved by the message analysis unit and time information contained in the reply message. With the configuration, the message generation unit receives calculation of a time error by the time error calculation unit, generates a second message containing time information indicating a time adjusted by an amount of time error calculated by the time error calculation unit, and makes the message sending/receiving unit send the second message to the communication terminal for which the time is to be set.

When the configuration in which a time setting sequence for sending and receiving a message twice is used, it is necessary to restructure software on the communication terminal and message center on a small scale. In the meanwhile, a correct time setting can be performed with a delay in sending and receiving a message. Therefore, a communication terminal can be realized in a well-balanced system between the cost of restructuring software and the precise time setting.

In the message center according to the present invention, it is preferable to further include a timer control unit for repeatedly performing at predetermined intervals the time setting sequence including sending the first and second messages to the same communication terminal.

By periodically performing the above-mentioned time setting sequence, the time of the communication terminal can be correctly maintained.

Additionally, in the communication terminal according to the present invention in a system in which the above-mentioned time setting sequence is performed, the message generation unit includes the time information indicating the sending time of the reply message for announcing the reception of the first message, and simultaneously generates a reply message including the error information indicating the time error between the time indicated by the time information retrieved from the first message received by the message sending/receiving unit as the current time, and the time controlled by the time control unit before the time set by the time control unit, thereby making the message sending/receiving unit transmit the reply message to the message center.

Correspondingly, in the message center according to the present invention in the system for performing the above-mentioned time setting sequence, the message analysis unit retrieves time information from a reply message which is sent from a communication terminal receiving the first message, received by the message sending/receiving unit, informs of reception of the first message, and includes time information indicating a sending time of the reply message from the communication terminal, and also includes error information indicating an error of the current time controlled by the communication terminal, and further retrieves the error information, and it is preferable to further include a next correction period calculation unit for calculating a period up to the next performance of the time setting sequence including the transmission of the first and second messages toward the communication terminal for which the time is to be set according to the time information and error information retrieved by the message analysis unit, and a timer control unit for monitoring the arrival of the period and starting, in response to the arrival of the period, the performance of the time setting sequence toward the communication terminal for which the time is to be set.

With the above-mentioned configuration, an error of the time of a communication terminal can be within a predetermined error.

The time control program storage medium according to the present invention for attaining the above-mentioned advantage stores a time control program executed in a communication terminal having a program executing facility and a wireless communication facility including sending and receiving a message which is sent to a receiving terminal without a send request from a receiving terminal through a message center, and the communication terminal is provided with a time control facility, including: a message sending/receiving unit for sending and receiving the above-mentioned message; a time control unit for controlling the current time; a message analysis unit for analyzing a message which is sent by a message center, received by the message sending/receiving unit, and includes time information assigned by a message center, and retrieving the time information; and a time setting unit for setting in the time control unit a time indicated by the time information retrieved by the message analysis unit as a current time.

It is preferable that the time control program storage medium according to the present invention stores a time control program for further assigning to a communication terminal a time control facility in a sequence control unit for performing a time setting sequence by monitoring the time setting sequence including two times of receiving a message to identify whether the message is the first message or the second message; and a message generation unit for receiving the first message for setting a time, generating a reply message including time information indicating the sending time of the reply message and making the message sending/receiving unit send the reply message to a message center.

The remote time setting program storage medium according to the present invention for attaining the above-mentioned advantage stores a remote time setting program which has a program executing facility, intermediates with a message sent from a sending terminal, and is executed in a message center for sending a message to a receiving terminal without waiting for a send request from the receiving terminal, and includes in the message center: a message sending/receiving unit for sending and receiving a message; a time control unit for controlling the current time; a message generation unit for generating a first message including time information indicating a sending time, and making the message sending/receiving unit send the first message to a communication terminal for which a time is to beset; a message analysis unit for retrieving time information from a reply message which is sent from a communication terminal receiving the first message, received by the message sending/receiving unit, informs of reception of the first message, and includes time information indicating a sending time of the reply message from the communication terminal; and a time error calculation unit for calculating a time error between a message sending time in the message center and a time setting time by the communication terminal for which a time is to be set according to time information contained in the first message, and time information retrieved by the message analysis unit and time information contained in the reply message. With the configuration, the message generation unit receives calculation of a time error by a time error calculation unit, generates a second message containing time information indicating a time adjusted by an amount of time error calculated by the time error calculation unit, and makes the message sending/receiving unit send the second message to the communication terminal for which the time is to be set.

In this example, the time control program and the remote time setting program have basic facilities, but each of them includes all configurations for realizing various aspects of the communication terminal and the message center according to the present invention.

According to the present invention, an automatic adjusting facility for remotely setting the time of a communication terminal can be realized with a high cost/performance ratio.

BRIEF DESCRIPTION OF THE DRAWINGS

Preferred embodiments of the present invention will be described in detail based on the following figures, wherein.

DETAILED DESCRIPTION OF THE INVENTION

The embodiments of the present invention are explained below.

Figure 1:
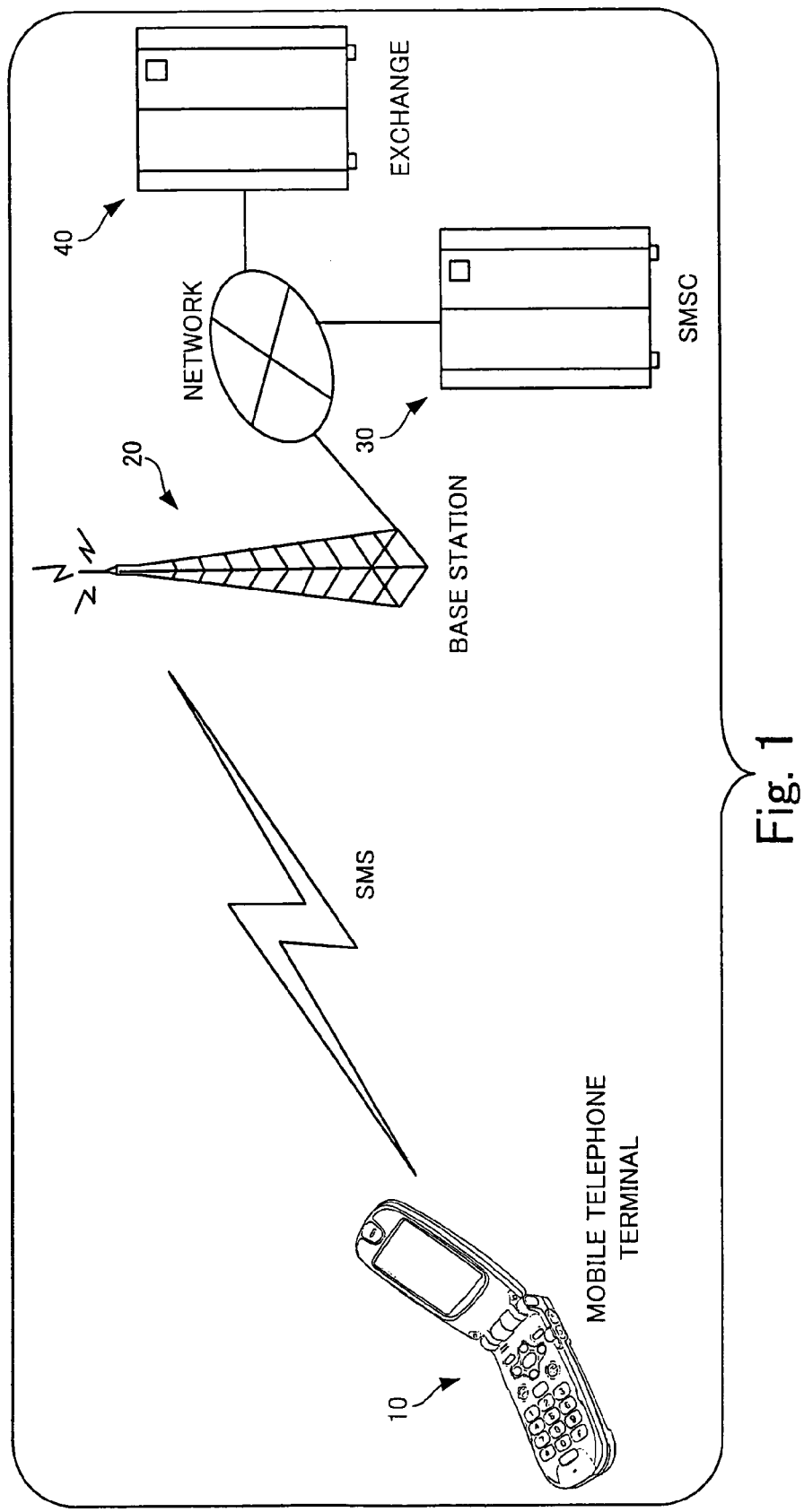
FIG. 1 shows a rough configuration of a network system including a mobile telephone terminal and a message center according to an embodiment of the present invention.

FIG. 1 shows a rough configuration of a network system including a mobile telephone terminal and a message center according to an embodiment of the present invention.

FIG. 1 shows a mobile telephone terminal 10, a base station 20 represented by antenna, an SMSC (short message service center) 30 functioning as a message center, and an exchange 40. They are representatives of the respective groups, that is, there are a number of mobile telephone terminals and base stations subscribing to the system. Since an SMS (short message service) is used according to the present invention, the wireless communication path between the base station 20 and the mobile telephone terminal 10 is described as SMS in FIG. 1. However, not only an SMS message but also the information for telephone transmission and reception and other data are communicated. When a call is made from the mobile telephone terminal 10, the information from the telephone is sent to the base station 20, transmitted through the exchange 40 to the base station in charge of the area where the mobile telephone terminal of the correspondent belongs, and to the mobile telephone terminal, etc. of the correspondent through the base station. This holds true with the case where the mobile telephone terminal 10 shown in FIG. 1 is a receiver.

The mobile telephone terminal 10 has a sending and receiving facility for an SMS message in accordance with the standard (depending on each company in the present situation) of the SMS. An SMS message is a rather short message having a small number of characters and transmitted and received using a telephone number as an address.

When the mobile telephone terminal 10 issues an SMS message, the SMS message is sent to the base station 20, and then to the SMSC 30 through the exchange 40 as necessary. The SMS message sent to the SMSC 30 is then transmitted to the receiving mobile telephone terminal, and the SMS message at this time basically includes the sending time information about the time when the message is sent from the SMSC 30 to the receiving mobile telephone terminal.

The SMS message sent from the SMSC 30 to the receiving mobile telephone terminal is sent to a base station in charge of the area to which the receiving mobile telephone terminal belong through an exchange as necessary, and is sent from the base station to the receiving mobile telephone terminal. Although there is no request from the receiving mobile telephone terminal to send a message, the SMSC 30 sends a SMS message to the receiving mobile telephone terminal. If the mobile telephone terminal receiving the message is in an incommunicable state (power-off state, not in a state of receiving radio wave, etc.), the SMSC 30 sends the SMS message to the receiving mobile telephone terminal when it recovers to the communicable state.

This holds true also when the mobile telephone terminal 10 is a receiver of an SMS message.

The mobile telephone terminal 10 also has the function of sending and receiving normal electronic mail. When electronic mail is communicated, the electronic mail issued from a sending terminal to a receiving terminal is temporarily accumulated in a mail server (not shown in the attached drawings), and is sent from the mail server to the receiving terminal at a send request from a receiving terminal.

Figure 2:
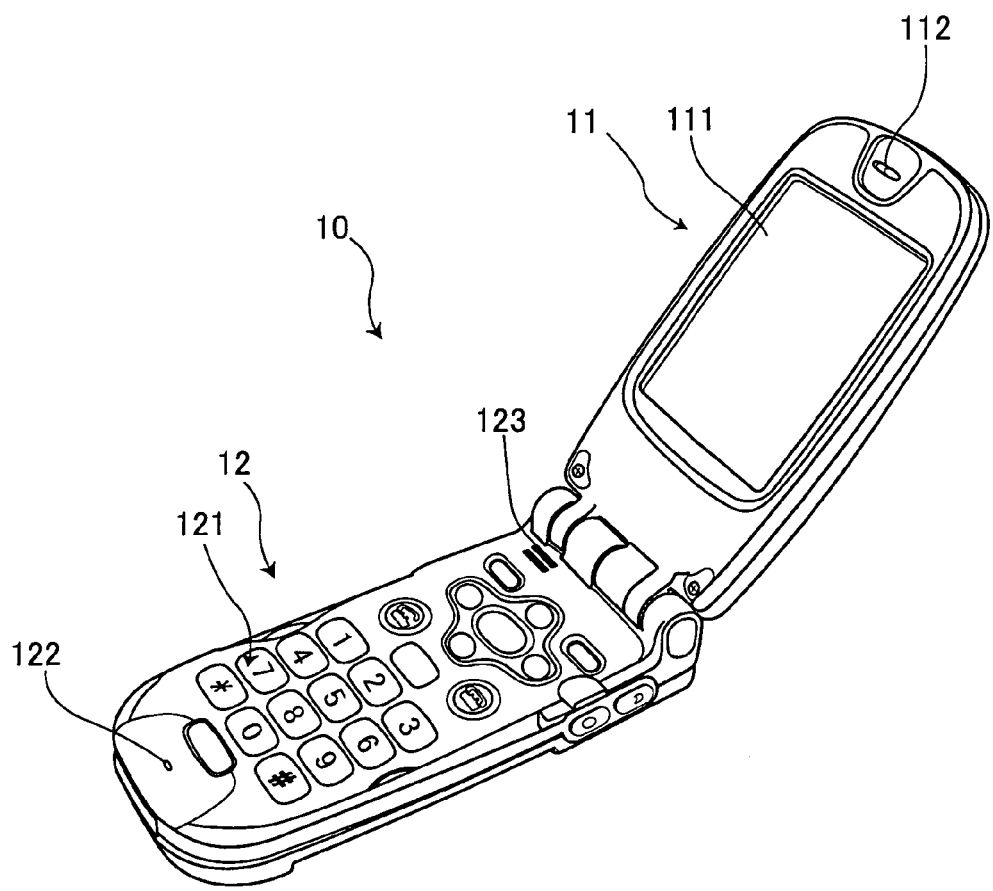
FIG. 2 is a perspective view of the appearance of the mobile telephone terminal according to the embodiment of the present invention shown in FIG. 1.

FIG. 2 is a perspective view of the appearance of the mobile telephone terminal 10 according to the embodiment of the present invention shown in FIG. 1. The mobile telephone terminal 10 is configured by an upper housing 11 and a lower housing 12 which can be opened and closed to each other. The upper housing 11 is provided with an LCD 111 for displaying various images and an earpiece 112 containing a small speaker for outputting voice with the unit placed on the ear. The lower housing 12 is provided with various keys 121 used in inputting a telephone number, inputting an SMS message, inputting electronic mail, and setting various modes, a mouthpiece 122 placed near the mouth of a user and containing a microphone for picking up the voice of the user, and a speaker outlet 123 containing a large speaker capable of picking up voice with the mobile telephone terminal 10 placed off the face of the user.

Figure 3:
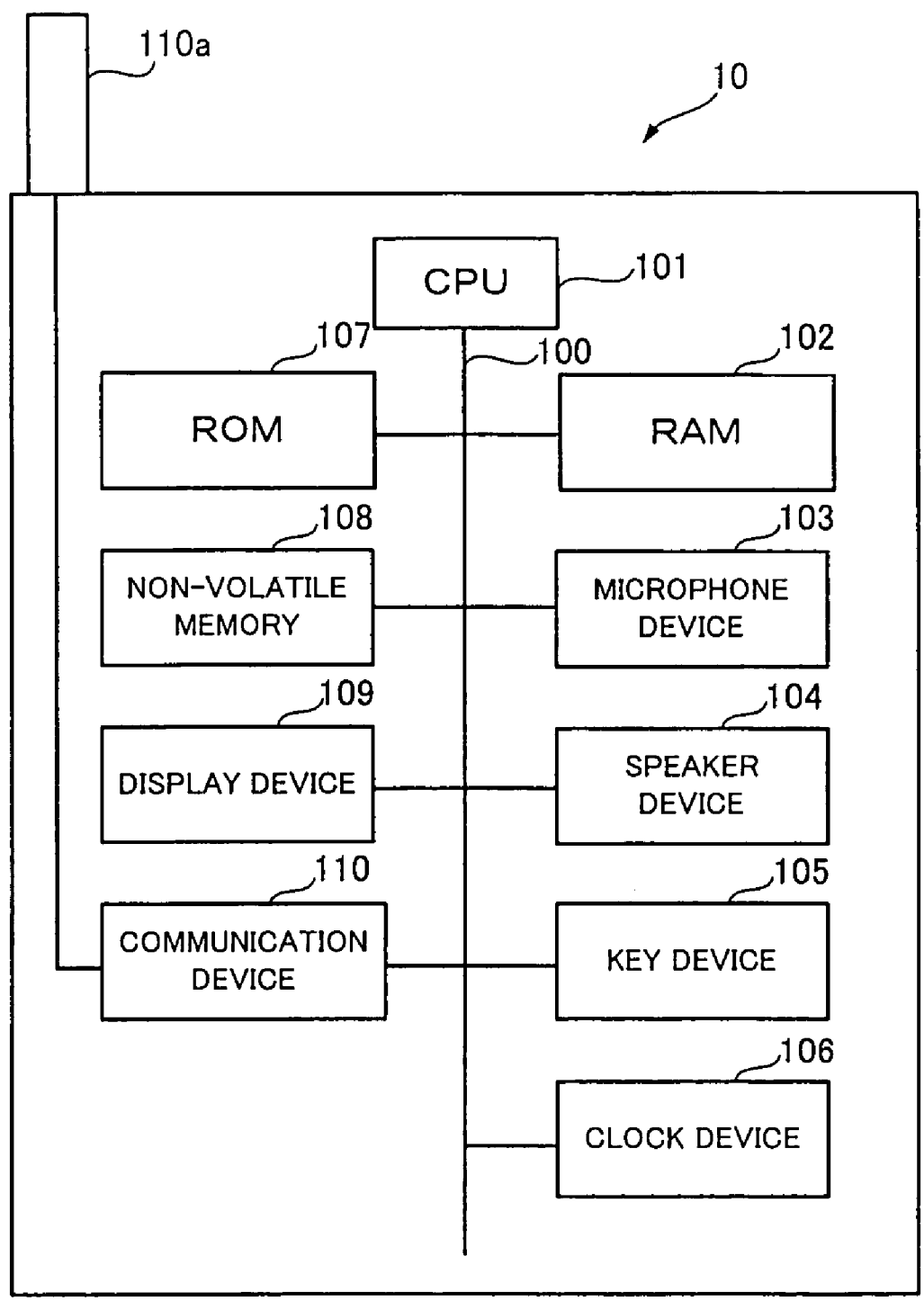
FIG. 3 shows the configuration inside the mobile telephone terminal shown in FIG. 2.

FIG. 3 shows the configuration inside the mobile telephone terminal 10 shown in FIG. 2.

FIG. 3 shows a CPU 101, RAM 102, a microphone device 103, a speaker device 104, a key device 105, a clock device 106, ROM 107, non-volatile memory 108, a display device 109, a communication device 110, and an antenna 110*a*. They are interconnected with one another through a bus 100 except the antenna 110*a*.

The CPU 101 has the function of executing various programs, and controls the entire mobile telephone terminal 10.

The ROM 107 stores various programs executed by the CPU 101, and various constants required in executing each of the various programs. The CPU 101 executes the program stored in the ROM 107 using the RAM 102 as a work area.

The non-volatile memory 108 stores various setting conditions, etc. of the mobile telephone terminal 10 which can be rewritten.

The microphone device 103 includes a microphone for picking up the voice of a user and a function block for processing the voice picked up by the microphone.

The speaker device 104 includes a speaker for outputting voice to a user and a function block for driving the speaker and generating a voice signal.

The key device 105 is a block for detecting the key operation of various operation keys 121 (refer to FIG. 2) by a user. The clock device 106 is a block for managing the current time. The display device 109 is a block for displaying an image on the LCD 111 shown in FIG. 2. The current time managed by the clock device 106 is as precise as a quartz clock.

The communication device 110 performs communications for telephone through the antenna 110*a*, for an SMS message, for electronic mail, etc.

Figure 4:
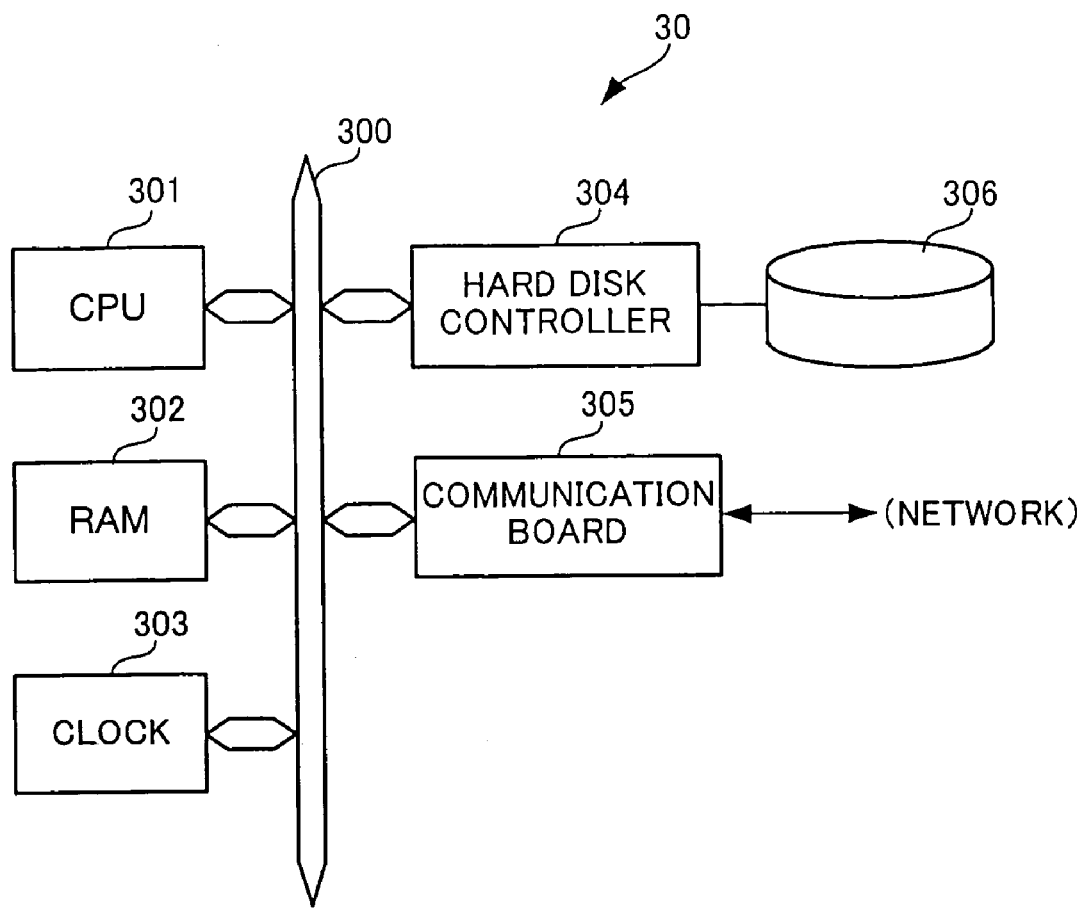
FIG. 4 shows the configuration of the inside of the SMSC shown in FIG. 1.

FIG. 4 shows the configuration of the inside of the SMSC 30 shown in FIG. 1.

The SMSC 30 is configured by a computer for executing a program. FIG. 4 shows only basic components for executing a program and communicating an SMS message. That is, FIG. 4 shows a CPU 301, memory 302, a clock 303, a hard disk controller 304, a communication board 305, and a hard disk 306 accessed by the hard disk controller 304.

The hard disk 306 stores various programs executed by the CPU 301. When the CPU 301 executes a program, the program is read from the hard disk 306, developed in the memory 302, and the program developed in the memory 302 is executed by the CPU 301.

The clock 303 is a function block for managing the current time. The clock 303 is formed by, for example, a radio clock, and the current time is correctly controlled.

The communication board 305 is connected to a network, and communicates an SMS message.

Figure 5:
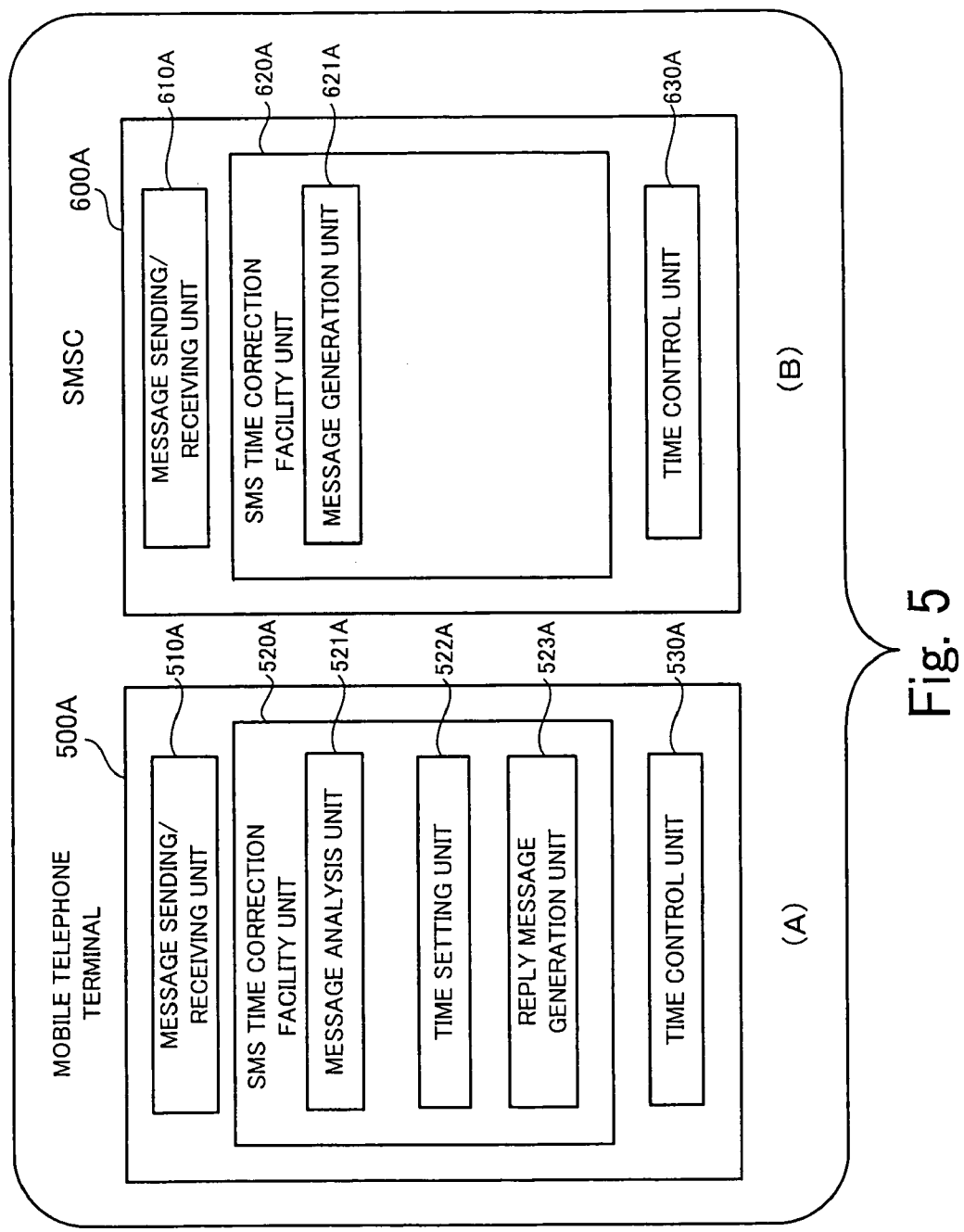
FIG. 5 shows the rough configuration of each software executed in the mobile telephone terminal and the SMSC.

FIG. 5 shows the rough configuration of each software executed in the mobile telephone terminal 10 and the SMSC 30.

In the mobile telephone terminal 10, a time control program 500A having the configuration shown in FIG. 5A and stored in the ROM 107 is executed. In the SMSC 30, a remote time setting program 600A having the configuration shown in FIG. 5B and stored in the hard disk 306 is executed.

The time control program 500A shown in part (A) of FIG. 5 and executed in the mobile telephone terminal 10 is configured by a message sending/receiving unit 510A, an SMS time correction facility unit 520A, and a time control unit 530A, and the SMS time correction facility unit 520A is configured by a message analysis unit 521A, a time setting unit 522A, and a reply message generation unit 523A.

The message sending/receiving unit 510A provides the function required to communicate an SMS message using the communication device 110 shown in FIG. 3, and the time control unit 530A controls the time of the mobile telephone terminal using the clock device 106 shown in FIG. 3. The message analysis unit 521A configuring the SMS time correction facility unit 520A retrieves the time information contained in the message from a received message, and the time setting unit 522A sets the retrieved time information in the time control unit 530A. Thus, the clock device 106 (FIG. 3) keeps the time using the set time as the current time. Furthermore, the message generation unit 523A generates a reply message indicating the reception of an SMS message, and sends it to the message sending/receiving unit 510A toward the SMSC 30. In this example, for compatibility with each of the embodiments described later, the message generation unit 523A is provided in the SMS time correction facility unit 520A. However, according to the present embodiment, the reply message is a notification of the reception of an SMS message, and has nothing to do directly with the setting of time.

The remote time setting program 600A executed in the SMSC 30 shown in part (B) of FIG. 5 includes a message sending/receiving unit 610A, an SMS time correction facility unit 620A, and a time control unit 630A. The SMS time correction facility unit 620A includes a message generation unit 621A.

The message sending/receiving unit 610A manages the communication of an SMS message using the communication board 305 shown in FIG. 4, and the time control unit 630A correctly controls the current time using the clock 303 shown in FIG. 4.

The message generation unit 621A of the SMS time correction facility unit 620A assigns the current time to the header of the SMS message at the time when the SMS message is sent toward a receiving terminal.

The function of communicating a message, the function of assigning sending time to the header, and the function of controlling time performed by an SMSC 600 are well known functions, and the well known functions are named a "remote time setting program 600A" as shown in part (B) of FIG. 5 from the viewpoint of setting time for a mobile telephone terminal. In the present embodiment, the improvement of a program in the SMSC is actually unnecessary.

Figure 6:
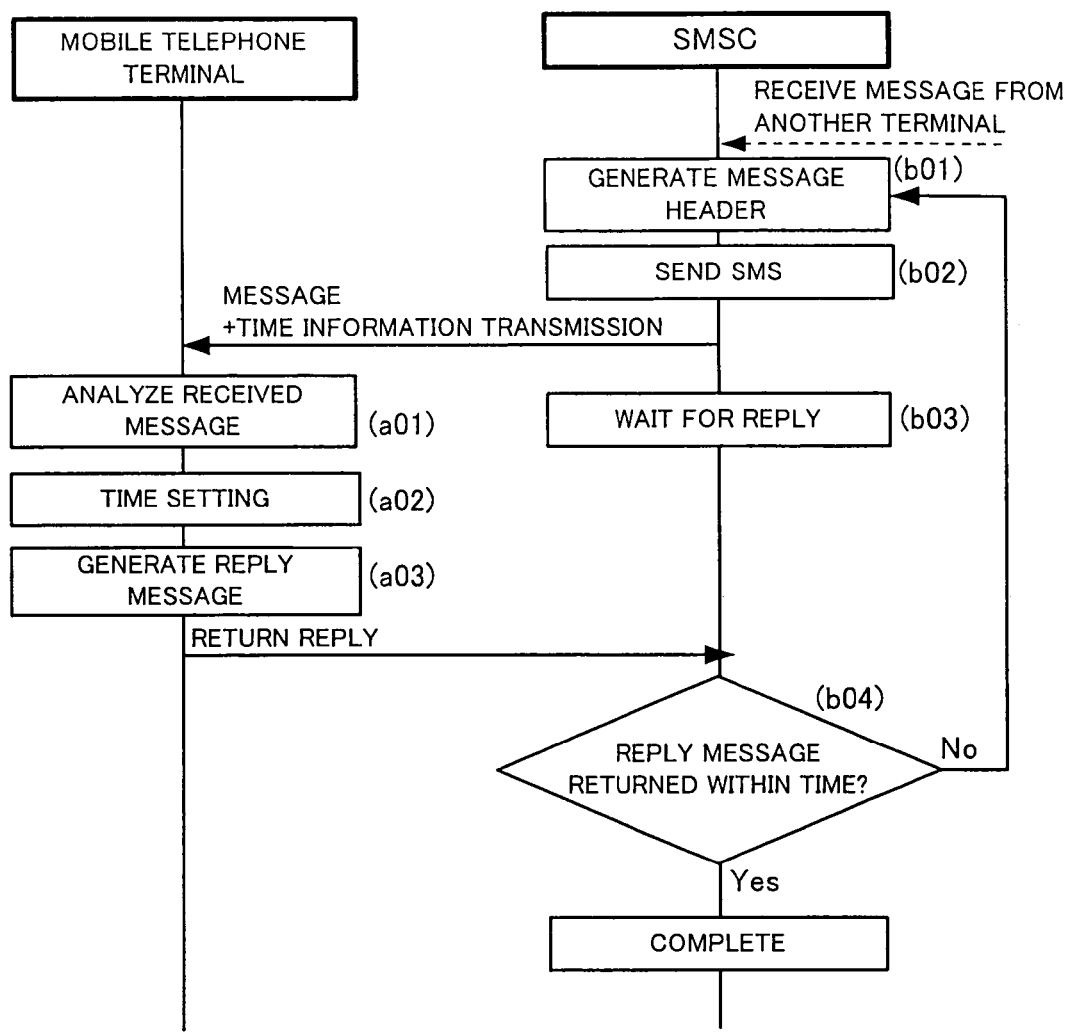
FIG. 6 is a flowchart showing the process performed by the mobile telephone terminal and the SMSC when the mobile telephone terminal and the SMSC respectively execute the time control program and the remote time setting program shown in FIG. 5.

FIG. 6 is a flowchart showing the process performed by the mobile telephone terminal and the SMSC when the mobile telephone terminal and the SMSC respectively execute the time control program and the remote time setting program shown in FIG. 5.

The process shown in FIG. 6 is explained below by referring to FIG. 5.

As shown in. FIG. 6, when the SMS message to the mobile telephone terminal is sent by another terminal not shown in the attached drawings, the SMS message is received by the message sending/receiving unit 610A of the SMSC.

In the SMSC in this example, upon receipt of an SMS message, the message generation unit 621A obtains the current time from the time control unit 630A, generates a message header including the time information indicating the current time, incorporates it into the original SMS message (step b01), and sends the resultant SMS message from a message sending/receiving unit 610A to a mobile telephone terminal (step b02). Then, the SMSC enters a reply wait state (step b03).

On the other hand, after the mobile telephone terminal receives a message through the message sending/receiving unit 510A, the message analysis unit 521A obtains the time information set in the SMSC (step a01). Then, the time setting unit 522A newly sets time based on the obtained time information for the time control unit 530A.

Then, the message generation unit 523A generates a reply message announcing the arrival of an SMS message (step a03), and the message sending/receiving unit 510A sends the reply message to the SMSC.

If an SMSC which has been in the reply wait receives a reply message from the mobile telephone terminal in the message sending/receiving unit 610A in the message wait period (step b04), it is assumed that the time correction has been completed. If a reply message from the mobile telephone terminal has not reached in the reply wait time, control is returned to step b01, the current time is obtained again, and the process is re-performed from the step of generating a message header.

According to the present embodiment, time is automatically set using an SMS message as described above.

The second embodiment of the present invention is explained below. The embodiments described below including the second embodiment have common entire systems (FIG. 1) and common components with the above-mentioned embodiment including the hardware of a mobile telephone terminal (FIGS. 2 and 3) and the hardware of the SMSC (FIG. 4). Therefore, double drawings and explanation are avoided, and the time control program for use in a mobile telephone terminal, the remote time setting program for use in an SMSC, and the operations of the mobile telephone terminal and the SMSC when the programs are executed are explained below.

Figure 7:
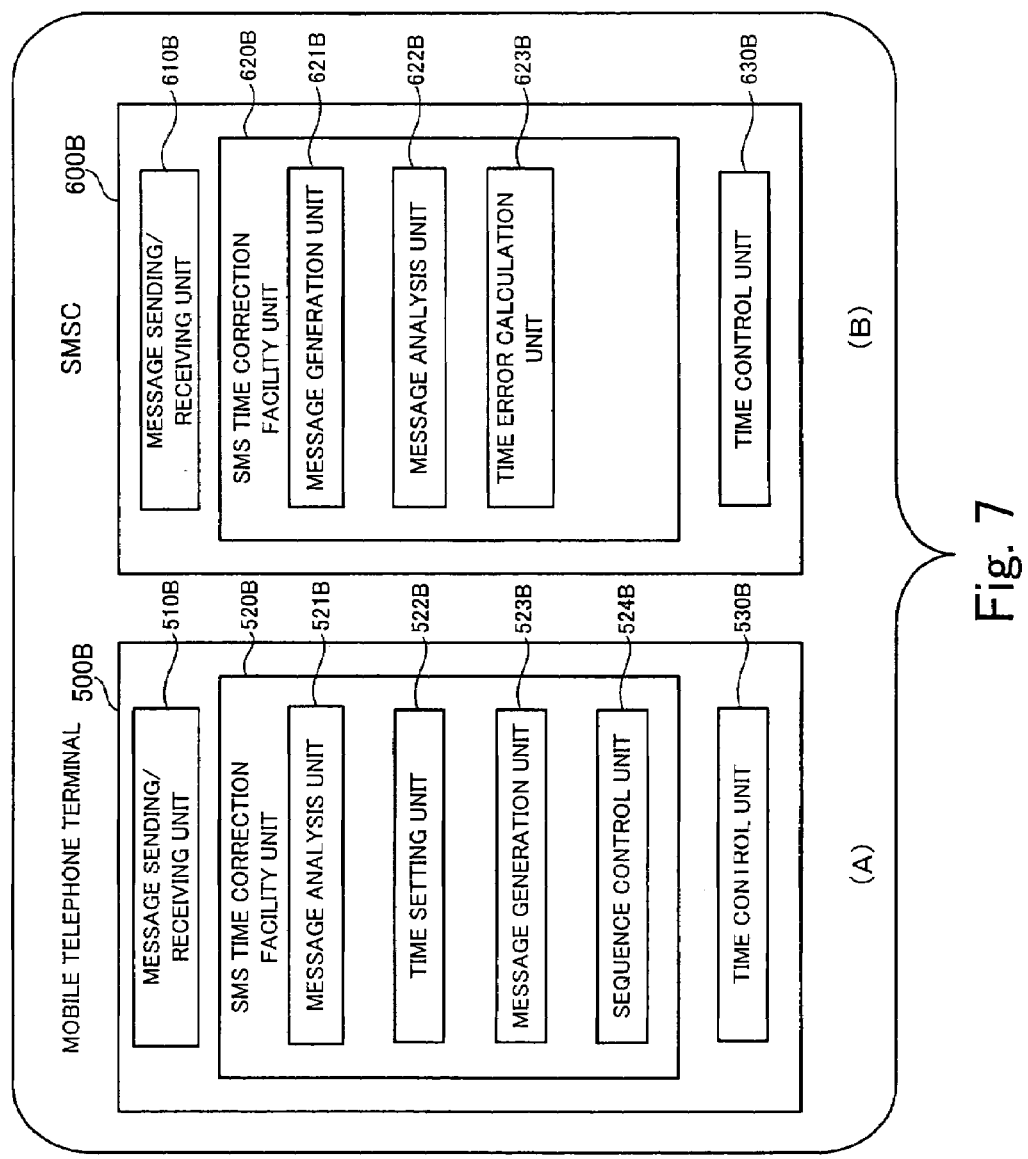
FIG. 7 shows the configuration of the time control program and the remote time setting program according to the second embodiment.

FIG. 7 shows the configuration of the time control program and the remote time setting program according to the second embodiment.

In a mobile telephone terminal, a time control program 500B having the configuration shown in part (A) of FIG. 7 is executed. In an SMSC, a remote time setting program 600B having the configuration shown in part (B) of FIG. 7 is executed.

The time control program 500B shown in part (A) of FIG. 7 and executed in a mobile telephone terminal is configured by a message sending/receiving unit 510B, an SMS time correction facility unit 520B, and a time control unit 530B. The SMS time correction facility unit 520B is configured by a message analysis unit 521B, a time setting unit 522B, a message generation unit 523B, and a sequence control unit 524B.

The message analysis unit 521B, the time setting unit 522B, and the time control unit 530B in the message sending/receiving unit 510B and the SMS time correction facility unit 520B are the same respectively as the program parts corresponding to the above-mentioned embodiment (FIG. 5), that is, the message analysis unit 521A, the time setting unit 522A, and the time control unit 530A in the message sending/receiving unit 510A and the SMS time correction facility unit 520A. Therefore, the double explanation is avoided.

The message generation unit 523B generates a reply message indicating the reception of an SMS message, and sends it to the message sending/receiving unit 510B toward the SMSC. At this time, the message generation unit 523B obtains the current time controlled by the time control unit 530B in the mobile telephone terminal when the reply message is sent, generates a reply message accompanied by sending time information with the current time set as sending time in the header of a reply message, and makes the message sending/receiving unit 510B send the reply message to the SMSC.

In the second embodiment being explained, correct time can be set by a mobile telephone terminal twice receiving an SMS message from an SMSC. The sequence control unit 524B controls the flow of the two processes on the SMS message including the determination as to whether the SMS message received this time relates to the first SMS message or the second SMS message.

The remote time setting program 600B executed in the SMSC as shown in part (B) of FIG. 7 is configured by a message sending/receiving unit 610B, and SMS time correction facility unit 620B, and a time control unit 630B, and the SMS time correction facility unit 620B is configured by a message generation unit 621B, a message analysis unit 622B, and a time error calculation unit 623B.

The message sending/receiving unit 610B and time control unit 630B are respectively the same as the message sending/receiving unit 610A and the time control unit 630A which are the corresponding program parts in the above-mentioned embodiments (FIG. 5). Therefore, double explanation is avoided, and only the SMS time correction facility unit 620B is explained below.

The message generation unit 621B configuring the SMS time correction facility unit 620B sets in the header of the SMS message a sending time the first time, and an amended sending time the second time. The detailed explanation is given below.

The message analysis unit 622B analyzes the reply message sent from the mobile telephone terminal 500B, and retrieves the time information from the reply message. The time error calculation unit 623B calculates a time delay between the transmission of an SMS message from the SMSC to the mobile telephone terminal and the reception of the reply message in response to the SMS message based on the time indicated by the time information retrieved from the reply message and the current time correctly controlled by the time control unit 630B, and calculates the time error by the error between the sending time of the SMS message and the time set by the mobile telephone terminal.

The message generation unit 621B sets in the head of the second SMS message the time advanced by the time error obtained by the time error calculation unit 623B from the sending time of the second SMS message. Thus, the mobile telephone terminal which has received the second SMS message retrieves the time information contained in the second SMS message, sets it as the current time, thereby correctly amending the time.

Figure 8:
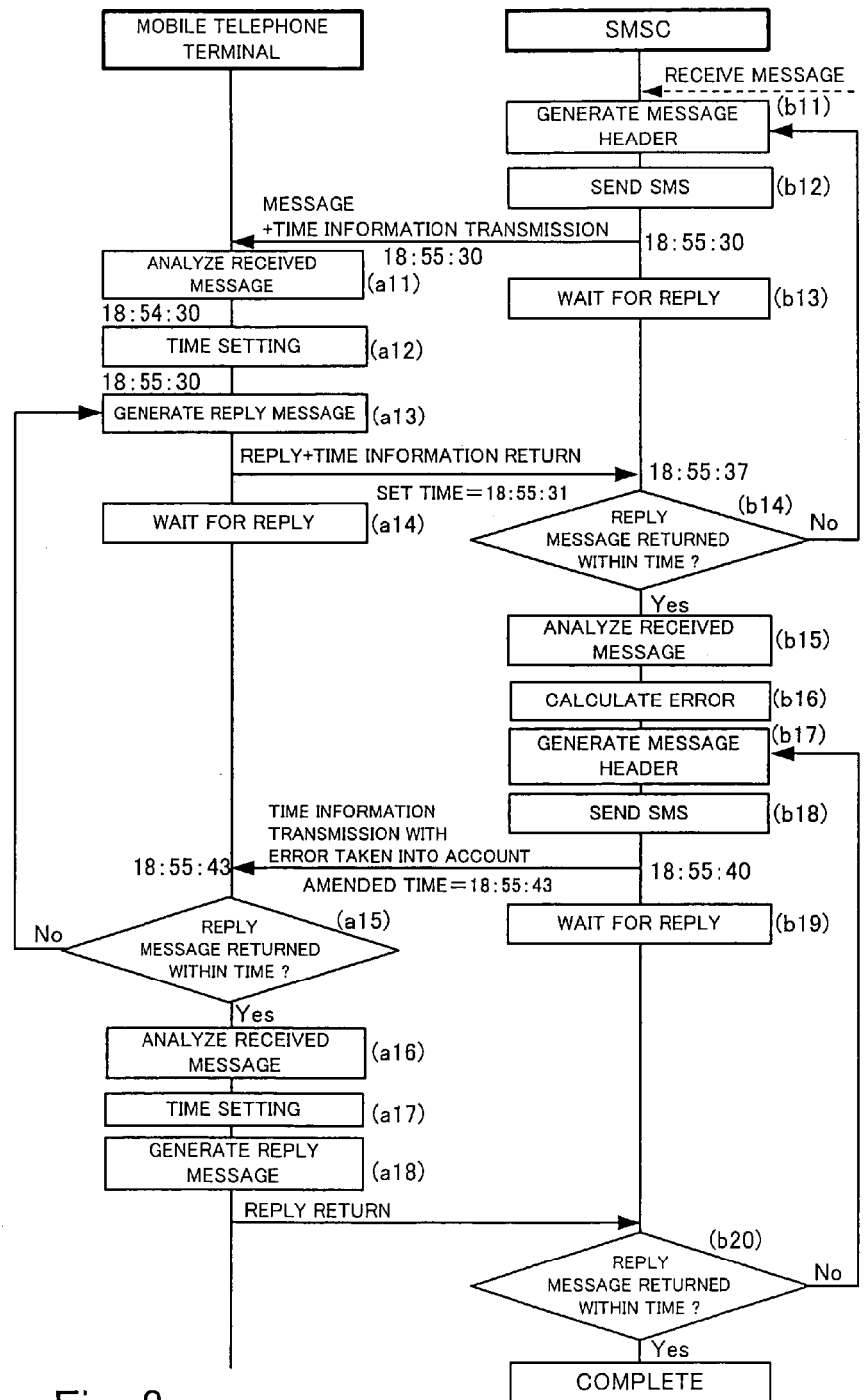
FIG. 8 is a flowchart showing the process performed by a mobile telephone terminal and an SMSC. The time control program and the remote time setting program shown in FIG. 7 are respectively executed by the mobile telephone terminal and the SMSC.

FIG. 8 is a flowchart showing the process performed by a mobile telephone terminal and an SMSC when the mobile telephone terminal and the SMSC respectively execute the time control program and the remote time setting program.

As shown in FIG. 8, when an SMS message addressed to a mobile telephone terminal is sent by another terminal, the message sending/receiving unit 610B of an SMSC receives the SMS message.

In this example, upon receipt of the SMS message, the message generation unit 621B in the SMSC obtains the current time (18.55.30 in the example shown in FIG. 8) from the time control unit 630A and generates a message header, and incorporates the message header into the original SMS message (step b11).

The incorporated SMS message is sent from the message sending/receiving unit 610B to the mobile telephone terminal (step b12). Then, the SMSC enters the reply wait state (step b13).

On the other hand, after receiving the SMS message by the message sending/receiving unit 510B, the mobile telephone terminal obtains the time information set by the SMSC through the message analysis unit 521B (step a11).

Then, the time setting unit 522B newly sets time (18.55.30 in the example shown in FIG. 8) on the time control unit 530B (step a12). In this example, the previously set time at the point when time (18.55.30) is newly set is 18.54.30, and the newly set time is 18.55.30.

Then, the message generation unit 523B generates a reply message about the setting of the sending time of the reply message in the header of the reply message as a notification of the arrival of the SMS message (step a13), and the message sending/receiving unit 510B sends a reply message with the sending time set therein. In this example, the time at the point when the reply message is sent and which is controlled by the time control unit 530B is assumed to be 18.55.31. In this example, the time (18.55.31) is set in the header of the reply message.

After the transmission, the sequence control unit 524B sets a reply wait status.

On the other hand, when the SMSC which has been in the reply message wait state receives a reply message from a mobile telephone terminal through the message sending/receiving unit 610B during the wait for the reply message (step b14), the message analysis unit 622B analyzes a reply message, and retrieves the time set by the mobile telephone terminal (step b15). The time error calculation unit 623B calculates a message arrival time lag (18.55.37-18.55.31) from the current time (18.55.37 in this example) obtained from the time control unit 630B and the time (18.55.31 in this example) retrieved from the reply message, and passes a half (3 seconds) of the time lag as an amendment value to the message generation unit 621B (step b16). The message generation unit 523B generates a second SMS message by setting in the header an amended sending time (18.55.43) obtained by adding the amendment value (3 seconds) received from the time error calculation unit 623B to the sending time (18.55.40), and makes the message sending/receiving unit 610B send the generated message to the mobile telephone terminal (step b18).

Then, the SMSC enters the reply wait state again (step b19).

When a reply message from the mobile telephone terminal is not received during the wait for a reply (step b14), control is returned to step b11, the current time is obtained again, and the process is started again from the step of generating a message header.

The mobile telephone terminal which has been in the reply wait state (step a14) receives an SMS message containing amended time information through the message sending/receiving unit 510B, the message analysis unit 521B obtains the amended time information set in the SMSC, and the time setting unit 522B sets the amended time in the time control unit 530B.

After setting the time, the message generation unit 523B generates a reply message as a notification of the arrival of the amendment information, and the message sending/receiving unit 510B sends the message to the SMSC.

If the SMSC which has been in the reply wait state receives a reply message from the mobile telephone terminal through the message sending/receiving unit 610B during the wait for a reply message, it is assumed that the time amendment has been completed (step b20).

On the other hand, when a reply message from a mobile telephone terminal is not received during the wait for a reply, control is returned to step b17, the current time is obtained again, the time is set in the message header with an error time taken into account, and the SMS message is sent again.

According to the second embodiment, an automatic time amendment can be made with the smallest error by performing the time setting sequence in which an SMS message is sent twice from the SMSC.

Figure 9:
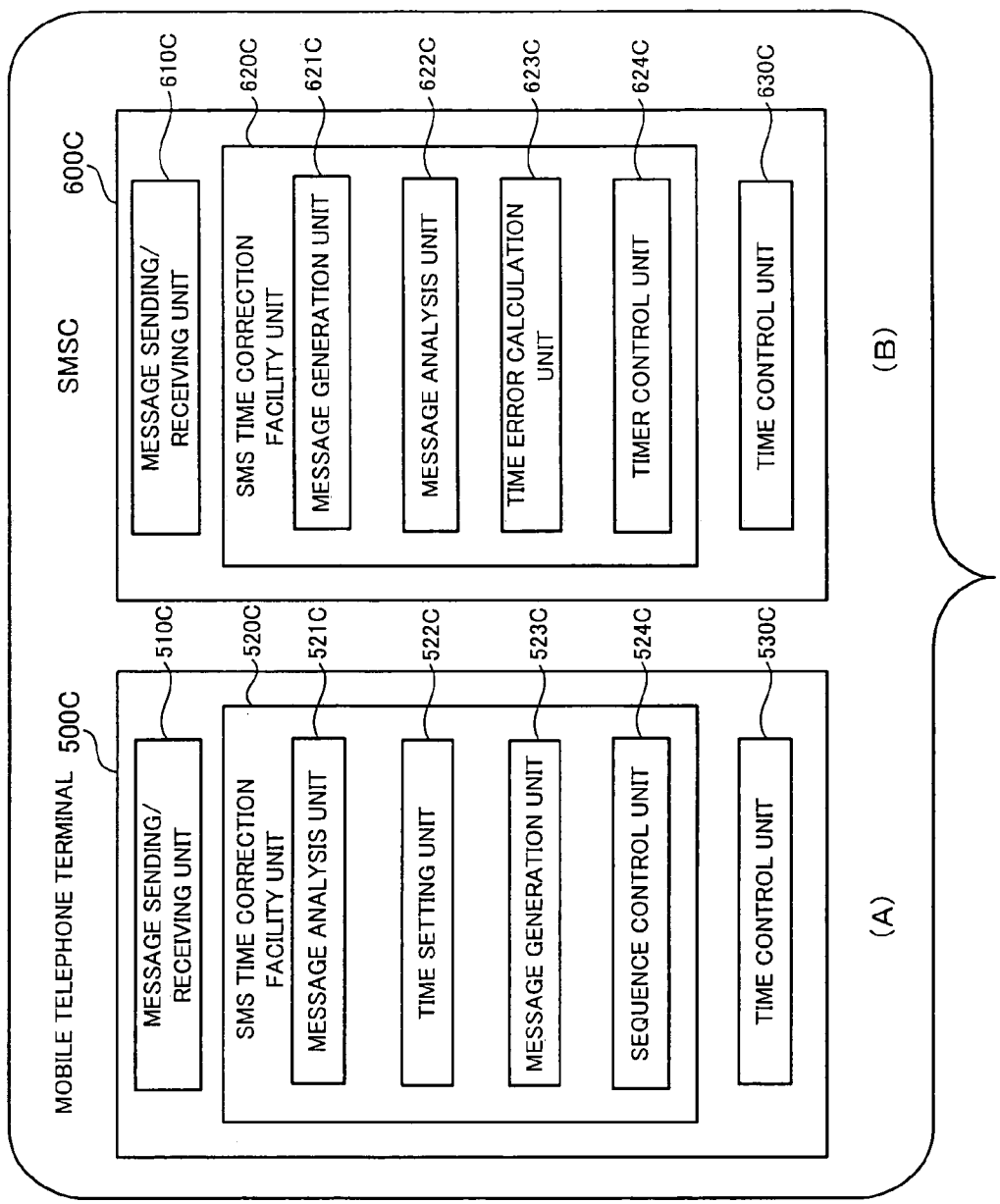
FIG. 9 shows the rough configuration of the time control program and the remote time setting program according to the third embodiment of the present invention.

FIG. 9 shows the rough configuration of the time control program and the remote time setting program according to the third embodiment of the present invention.

The explanation of the third embodiment is given by describing the difference from the second embodiment by referring to FIGS. 7 and 8. First, FIG. 9 is explained by pointing out the difference from FIG. 7.

A time control program 500C shown in FIG. 9 has the same configuration as the time control program 500B shown in FIG. 7, and double explanation is avoided. However, the reference numeral assigned to each program part is changed from a number+ an alphabetical character B to a number+ alphabetical character C.

When a remote time setting program 600C shown in FIG. 9 is compared with the remote time setting program 600B shown in FIG. 7, a timer control unit 624C is added. Other program parts are the same in function except the change from B to C in reference numerals.

The timer control unit 624C measures the period (for example, 30 days) set in advance in the SMSC, and repeatedly issues a time amend request in each period.

Figure 10:
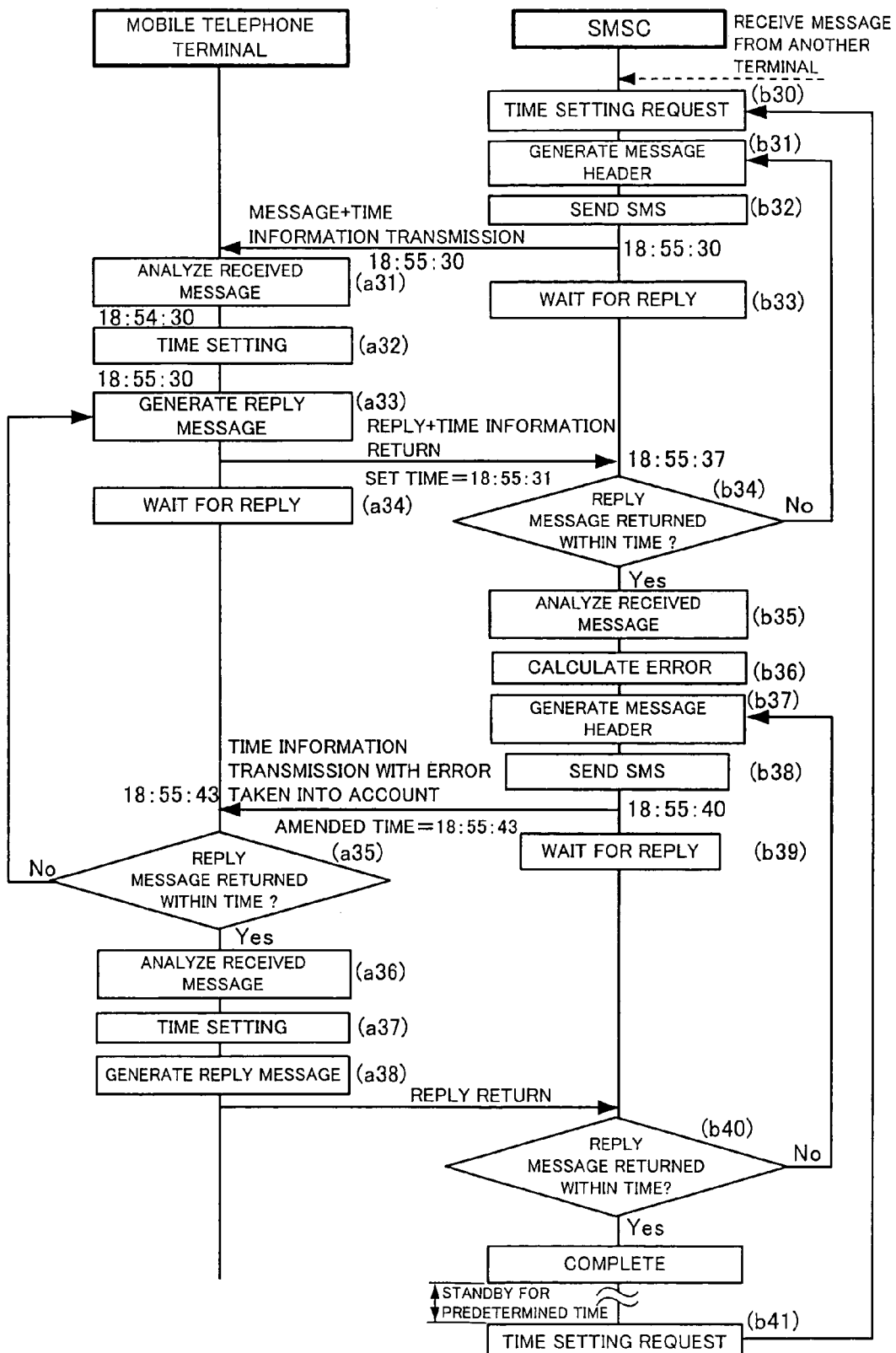
FIG. 10 is a flowchart showing the process performed by a mobile telephone terminal and an SMSC when the time control program and the remote time setting program shown in FIG. 9 are respectively executed by the mobile telephone terminal and the SMSC.

FIG. 10 is a flowchart showing the process performed by a mobile telephone terminal and an SMSC when the time control program and the remote time setting program shown in FIG. 9 are respectively executed by the mobile telephone terminal and the SMSC. Only the difference from the flowchart according to the second embodiment shown in FIG. 8 is explained.

The process (steps a31 to a38) by the mobile telephone terminal according to the third embodiment shown in FIG. 10 is the same as the process (step a11 to a18) by the mobile telephone terminal according to the second embodiment shown in FIG. 7, and the double explanation is avoided.

In the process by the SMSC according to the third embodiment shown in FIG. 10, steps b31 to b40 are the same as the process (steps b11 to b20) by the SMSC according to the second embodiment shown in FIG. 7, and steps b30 and b41 are added in representing the flowchart shown in FIG. 10.

Step b30 indicates that the SMS message to be received by a mobile telephone terminal has been received by the SMSC and an event of a time amend request is issued. In FIG. 8, although the step is not clarified, it is practically the same.

In step b40, when a reply message from a mobile telephone terminal is received during the wait for a reply message, it is assumed that a time amendment has been completed, but the timer control unit 624C starts counting the predetermined period (for example, 30 days) from the beginning. When the period passes, a time amend request event is issued (step b41), and the time setting sequence is started again.

According to the third embodiment, a time amendment to a mobile telephone terminal is made in each period (for example, 30 days) counted by the timer control unit 624C although an SMS message is not sent from another terminal, and the mobile telephone terminal can maintain the time with high precision.

Figure 11:
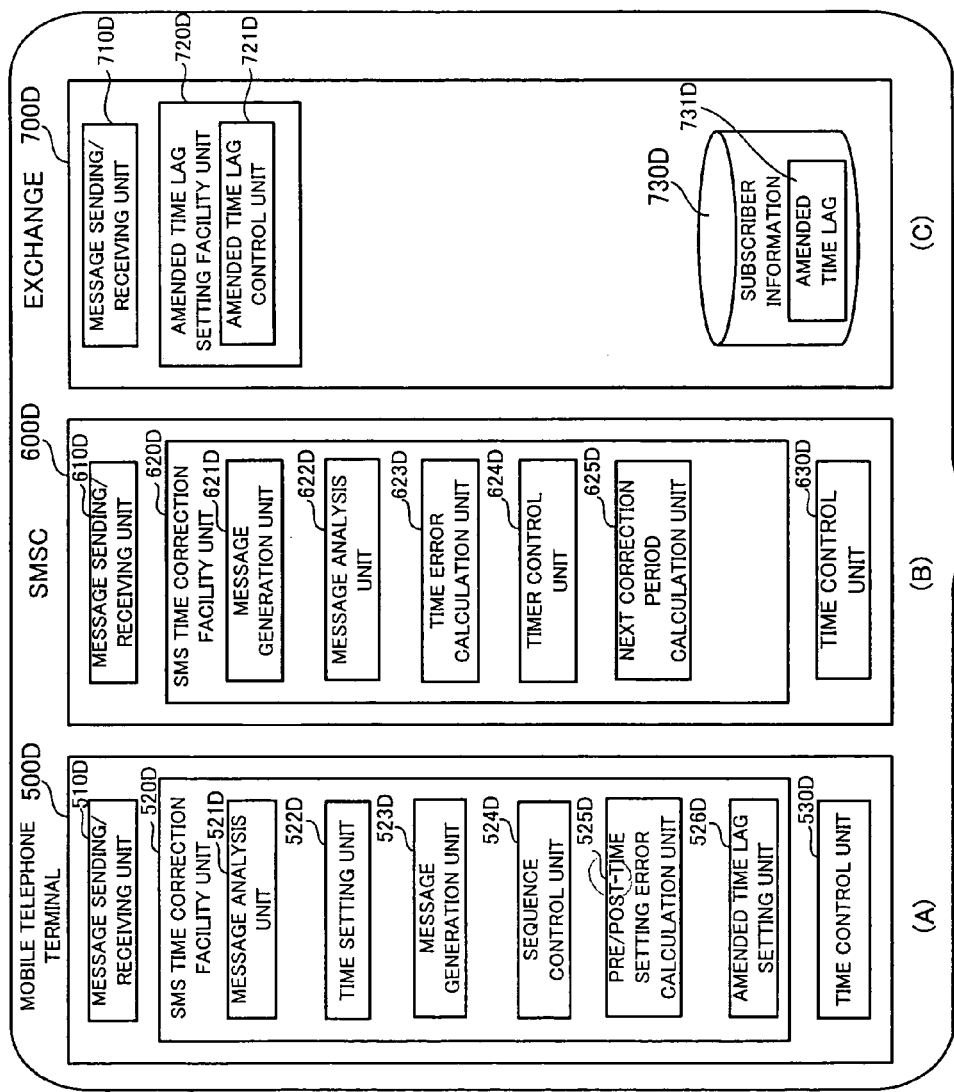
FIG. 11 shows the rough configuration of the a time control program, a remote time setting program, and an amended time lag control program according to the fourth embodiment of the present invention.

FIG. 11 shows the rough configuration of the a time control program (part (A) of FIG. 11), a remote time setting program (part (B) of FIG. 11), and an amended time lag control program (part (C) of FIG. 11) according to the fourth embodiment of the present invention. In a mobile telephone terminal, a time control program 500D with the configuration shown in part (A) of FIG. 11 is executed. In an SMSC, a remote time setting program 600D with the configuration shown in part (B) of FIG. 11 is executed. In an exchange, an amended time lag control program shown in part (C) of FIG. 11 is executed. According to the fourth embodiment, the exchange also has the function of amending time of a mobile telephone terminal.

The hardware configuration of an exchange for realizing the function explained below is to be the same as the hardware configuration of the SMSC shown in FIG. 4. The drawings and explanation of the hardware configuration independent as an exchange are omitted here.

The time control program 500D executed in a mobile telephone terminal as shown in part (A) of FIG. 11 is configured by a message sending/receiving unit 510D, an SMS time correction facility unit 520D, and a time control unit 530D. The SMS time correction facility unit 520D is configured by a message analysis unit 521D, a time setting unit 522D, a message generation unit 523D, a sequence control unit 524D, a pre/post time setting error calculation unit 525D, and an amended time lag setting unit 526D.

The difference from the second embodiment is mainly explained below based on the second embodiment by referring to FIGS. 7 and 8.

The message sending/receiving unit 510D and the time control unit 530D of the time control program 500D shown in part (A) of FIG. 11 are the same respectively as the message sending/receiving unit 510B and the time control unit 530B of the time control program 500B shown in FIG. 7A, and the explanation is omitted here.

In the SMS time correction facility unit 520D configuring the time control program 500D shown in part (A) of FIG. 11, the message analysis unit 521D, the time setting unit 522D, and the sequence control unit 524D are the same respectively as the message analysis unit 521B, the time setting unit 522B, and the sequence control unit 524B corresponding in the SMS time correction facility unit 520B configuring the time control program 500B shown in part (A) of FIG. 7.

In the SMS time correction facility unit 520D configuring the time control program 500D shown in part (A) of FIG. 11, the pre/post time setting error calculation unit 525D calculates the time lag between the time controlled by the time control unit 530D and newly set time when the time setting unit 522D newly sets time on the time control unit 530D.

The message generation unit 523D generates a reply message by setting on a header not only sending time but also a time error obtained by the pre/post time setting error calculation unit 525D.

Furthermore, the amended time lag setting unit 526D sets the threshold of an error of the time controlled by the mobile telephone terminal against the correct time indicating the necessity to make an amendment by the key operation of a user of the mobile telephone terminal. For example, when an error of 10 seconds at maximum is to be permitted and an error exceeding 10 seconds is to be rejected, then 10 seconds is set by a key operation. The value of 10 seconds is sent to the exchange, and is recorded as amended time lag information 731D in a column of a subscriber user of the mobile telephone terminal in a subscriber information file 730D storing the information about the subscriber of the system.

The remote time setting program 600D executed in the SMSC shown in part (B) of FIG. 11 is configured by a message sending/receiving unit 610D, an SMS time correction facility unit 620D, and a time control unit 630D. The SMS time correction facility unit 620D is configured by a message generation unit 621D, a message analysis unit 622D, a time error calculation unit 623D, a timer control unit 624D, and a next correction period calculation unit 625D.

The message sending/receiving unit 610D and the time control unit 630D in the remote time setting program 600D are the same as the message sending/receiving unit 610B and the time control unit 630B corresponding in the remote time setting program 600B according to the second embodiment shown in FIG. 7, and the double explanation is avoided.

The message generation unit 621D in the SMS time correction facility unit 620D shown in part. (B) of FIG. 11 is the same as the message generation unit 621B in the SMS time correction facility unit 620B shown in part (B) of FIG. 7, and the message analysis unit 622D retrieves the time information indicating the sending time of the reply message from the header of the reply message sent from the mobile telephone terminal as with the message analysis unit 622B shown in FIG. 7B. Unlike the message analysis unit 622B shown in part (B) of FIG. 7, the message generation unit 523D retrieves the time error information set in the header of the reply message at a request of the pre/post time setting error calculation unit 525D.

The time error calculation unit 623D shown in part (B) of FIG. 11 is the same as the time error calculation unit 623B shown in part (B) of FIG. 7. The next correction period calculation unit 625D shown in part (B) of FIG. 11 has a unique configuration according to the fourth embodiment of the present invention, and obtains from the time error retrieved by the message analysis unit 622D the period until the next setting is made such that the amended time lag information 731D stored in the exchange and set by the subscriber can be satisfied. The timer control unit 624D counts the period obtained by the next correction period calculation unit 625D until the next setting is made.

An amended time lag control program 700D executed in an exchange is configured by the message sending/receiving unit 710D and the amended time lag setting facility 720D, and the exchange is provided with the subscriber information file 730D storing the information about a subscriber who has subscribed to the system. The amended time lag setting facility unit 720D is provided with the amended time lag control unit 721D. In the subscriber information file 730D, the amended time lag information 731D is recorded as associated with each subscriber.

A message sending/receiving unit 710D manages sending and receiving an SMS message.

The amended time lag control unit 721D retrieves information about the maximum allowance for the current time from the correct time controlled by the mobile telephone terminal from an SMS message containing the information, and sets the information as the amended time lag information 731D in the subscriber information file 730D. The amended time lag information 731D is referred to by the next correction period calculation unit 625D in the SMSC.

Figure 12:
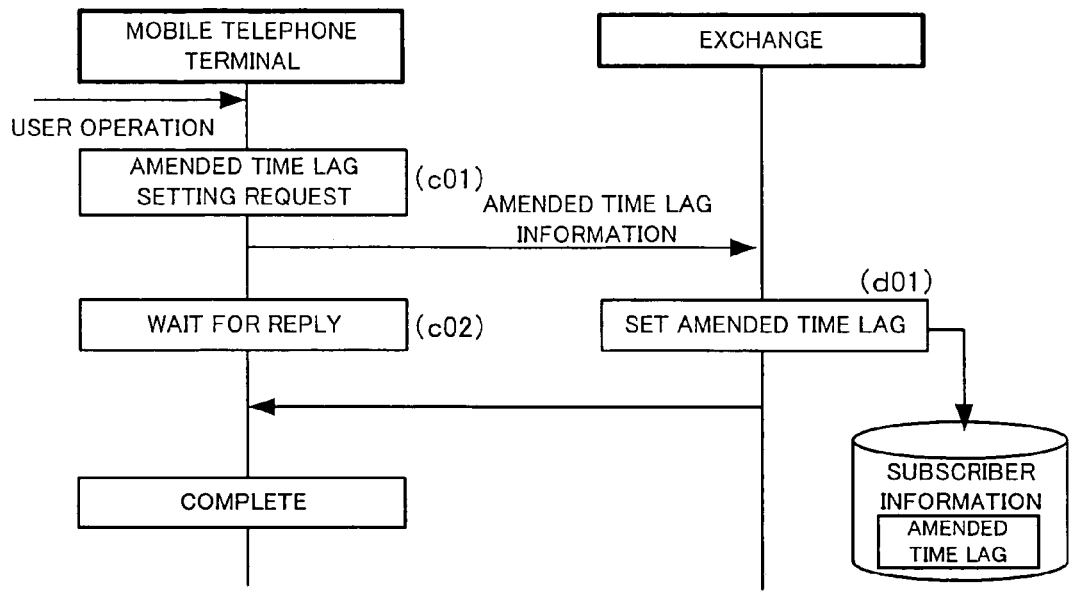
FIG. 12 is a flowchart of the processes of the mobile telephone terminal and the exchange when the amended time lag is set.

FIG. 12 is a flowchart of the processes of the mobile telephone terminal and the exchange when an amended time lag is set.

As shown in FIG. 12, the amended time lag setting unit 526D of the mobile telephone terminal sends an SMS message containing the amended time lag setting information set by the key operation of a user to the exchange, and requests setting of an amended time lag. (step c01).

Then, the mobile telephone terminal enters a reply wait state (step c02).

On the other hand, after the exchange receives an amended time lag setting request message through the message sending/receiving unit 710D, it updates the amended time lag information 731D of the requested mobile telephone terminal user in the subscriber information requested by the amend time lag control unit 721D (step d01).

When the amended time lag information is completely updated, the exchange sends a reply message to the mobile telephone terminal.

Figure 13:
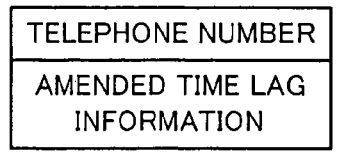
FIG. 13 shows the concept of the amended time lag information.

FIG. 13 shows the concept of the amended time lag information.

As shown in FIG. 13, the amended time lag information is formed by a telephone number uniquely identifying a user of a mobile telephone terminal, and an amended time lag information indicating an error of time to be set requested by a user of a mobile telephone terminal.

Figure 14:
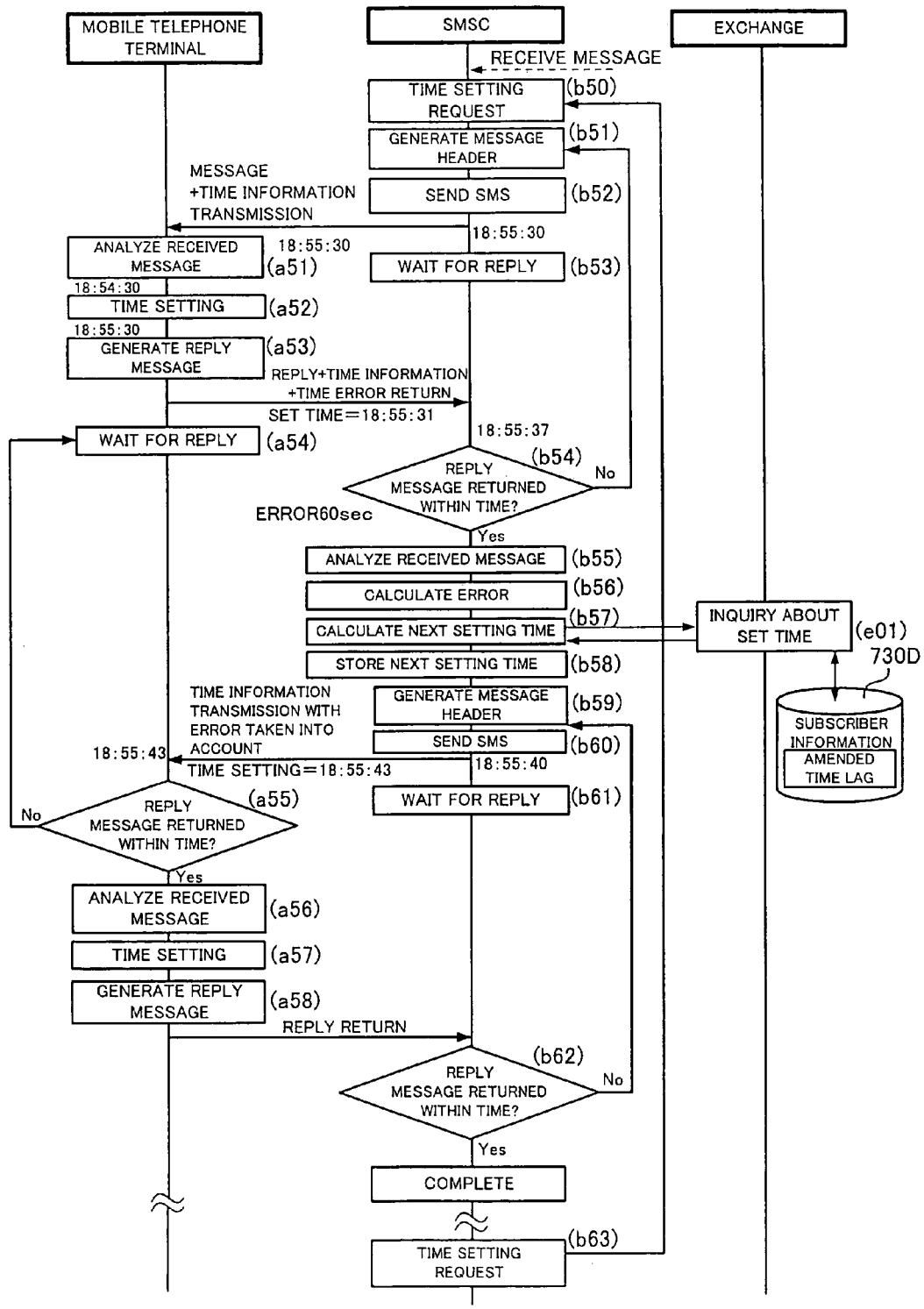
FIG. 14 is a flowchart of the processes performed by the mobile telephone terminal, the SMSC, and the exchange according to the fourth embodiment.

FIG. 14 is a flowchart of the processes performed by a mobile telephone terminal, an SMSC, and an exchange according to the fourth embodiment.

The process by the mobile telephone terminal shown in FIG. 14 is somewhat different in generating process (step a53) on a reply message from the process by the mobile telephone terminal according to the second embodiment shown in FIG. 8.

In step a53, the pre/post time setting error calculation unit 525D shown in FIG. 11 obtains an error between the time controlled by the time control unit 530D before the time setting unit 522D sets in the time control unit 530D the time retrieved from an SMS message by the message analysis unit 521D, and the time retrieved from the SMS message and set by the time control unit 530D. The message generation unit 523D sets the sending time information about the reply message and the time error obtained from the pre/post time setting error calculation unit 525D in the header of the reply message, generates a reply message having the header, and the reply message is sent to the SMSC by the message sending/receiving unit 510D.

In the process of the mobile telephone terminal shown in FIG. 11, the processes in other steps (steps a51, a52, a54 to a58) are the same as the processes in each step (steps a11, a12, a14 to a18) corresponding in the process performed by the mobile telephone terminal shown in FIG. 8, and double explanation is avoided.

In the process by the SMSC according to the fourth embodiment shown in FIG. 11, each of the processes in steps b51 to b56 is the same as each of the corresponding steps b11 to b16 in the process by the SMSC according to the second embodiment shown in FIG. 8. The processes in steps b59 to b62 shown in FIG. 11 are the same as the processes in steps b17 to b20 shown in FIG. 8. Therefore, double explanation is to be avoided, and steps b50, b57, b58, and b63 are explained below.

Step b50 clearly shows an issue of an event of an amended time lag setting request by the arrival of the SMS message sent to a receiving mobile telephone terminal shown in FIG. 14. Although the step is not clearly shown in FIG. 8, it is practically the same.

In step b57, the next correction period calculation unit 625D issues an inquiry about setting time to the exchange. In the exchange, the amended time lag control unit 721 inquires the amended time lag information about the mobile terminal user held in the subscriber information file 730D, and sends it to the SMSC (step e01).

The next correction period calculation unit 625D calculates the next setting time (for example, assuming that 30 days have passed from the previous setting day, the error is 60 seconds, and the amended time lag information is 10 seconds, the next setting is made five days from the current point according to the calculation of (30 days×10 seconds)/60 seconds based on the difference time (6 seconds in this example) between the current time obtained from a time control unit 630D and the terminal sending time retrieved from the header by the message analysis unit 622D, the previous setting time stored in the timer control unit 624, and the amended time lag information obtained from the exchange.

The next correction period calculation unit 625D passes the calculation result and the current time to the timer control unit 624D.

The timer control unit 624D keeps counting until the next setting time after the completion of the current time setting, and issues an amended time lag setting request again when the timer expires (step b63).

According to the fourth embodiment of the present invention, automatic time setting can be made in the optimum timing using an SMS message.

What is claimed is:

1. A message center which intermediates with a message sent from a sending terminal, sends the message to a receiving terminal without waiting for a send request from the receiving terminal, the message center comprising:

a message sending/receiving unit for sending and receiving a message;

a time control unit controlling a current time;

a message generation unit generating a first message including time information indicating a sending time, and making the message sending/receiving unit send the first message to a communication terminal for which a time is to be set;

a message analysis unit retrieving time information from a reply message which is sent from a communication terminal receiving the first message, received by the message sending/receiving unit, informs of reception of the first message, and includes time information indicating a sending time of the reply message from the communication terminal; and a time error calculation unit calculating a time error between a message sending time in the message center and a time setting time by the communication terminal for which a time is to be set according to time information which is contained in the first message and indicates the sending time of the first message, and time information retrieved by the message analysis unit and time information which is contained in the reply message and indicates the sending time of the reply message, wherein the message generation unit receives calculation of a time error by the time error calculation unit, generates a second message containing time information indicating a time adjusted by an amount of time error calculated by the time error calculation unit, and makes the message sending/receiving unit send the second message to the communication terminal for which the time is to be set.

2. The message center according to claim 1, further comprising a timer control unit repeatedly performing at predetermined intervals a time setting sequence including sending the first and second messages to the same communication terminal.

3. The message center according to claim 1, wherein the message analysis unit retrieves time information from a reply message which is sent from a communication terminal receiving the first message, received by the message sending/receiving unit, informs of reception of the first message, and includes time information indicating a sending time of the reply message from the communication terminal, and also includes error information indicating an error of current time controlled by the communication terminal, and further retrieves the error information, the message center further comprising:

a next correction period calculation unit calculating a period up to the next performance of the time setting sequence including the transmission of the first and second messages toward the communication terminal for which the time is to be set according to the time information and error information retrieved by the message analysis unit; and a timer control unit monitoring an arrival of the period and starting in response to the arrival of the period the performance of the time setting sequence toward the communication terminal for which the time is to be set.

4. A remote time setting program storage medium storing a remote time setting program which has a program executing facility, intermediates with a message sent from a sending terminal, and is executed in a message center for sending a message to a receiving terminal without waiting for a send request from the receiving terminal, the message center comprising:

a message sending/receiving unit sending and receiving a message;

a time control unit controlling the current time;

a message generation unit generating a first message including time information indicating a sending time, and making the message sending/receiving unit send the first message to a communication terminal for which a time is to be set;

a message analysis unit for retrieving time information from a reply message which is sent from a communication terminal receiving the first message, received by the message sending/receiving unit, informs of reception of the first message, and includes time information indicating a sending time of the reply message from the communication terminal; and a time error calculation unit for calculating a time error between a message sending time in the message center and a time setting time by the communication terminal for which a time is to be set according to time information which is contained in the first message and indicates the sending time of the first message, and time information retrieved by the message analysis unit and time information which is contained in the reply message and indicates the sending time of the reply message, wherein the message generation unit receives calculation of a time error by the time error calculation unit, generates a second message containing time information indicating a time adjusted by an amount of time error calculated by the time error calculation unit, and makes the message sending/receiving unit send the second message to the communication terminal for which the time is to be set.

* * * * *